Figure 5:
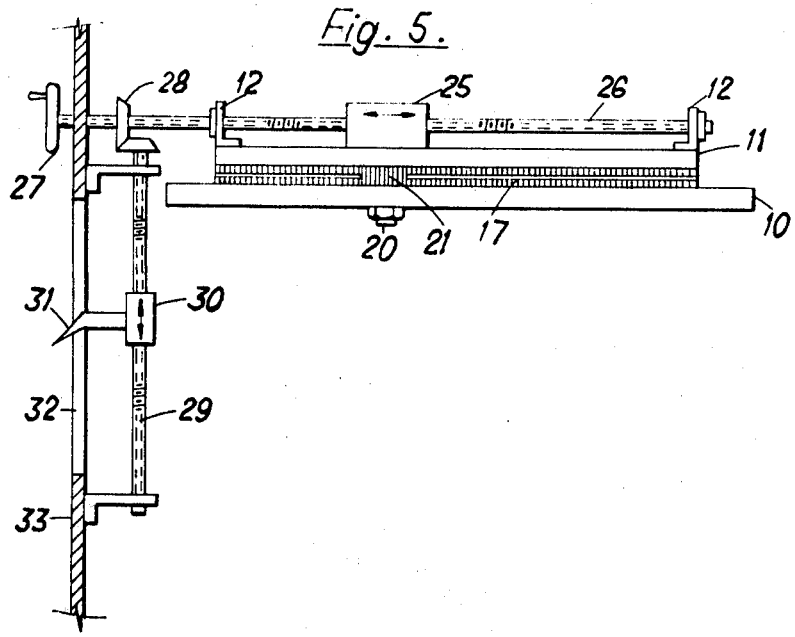

United States Patent [19]
Grant

[11] 3,898,887
[45] Aug. 12, 1975

[54] STROKE VARYING MECHANISM

[76] Inventor: Graham Cameron Grant, 16/49 Campbell Parade, Manly Vale, Sydney, New South Wales, Australia, 2093

[22] Filed: Sept. 10, 1973

[21] Appl. No.: 396,031

[30] Foreign Application Priority Data
Sept. 13, 1972 Australia............................. 0429/72
Nov. 17, 1972 Australia............................. 1268/72

[52] U.S. Cl. ............................................ 74/29
[51] Int. Cl. ........................................... F16h 19/04
[58] Field of Search .................................. 74/29, 30

[56] References Cited
UNITED STATES PATENTS
2,548,807  4/1951  Morgan et al. ......................... 74/41
3,621,723  11/1971  Miller ..................................... 74/29
3,709,050  1/1973  Granger ................................. 74/29

*Primary Examiner*—Samuel Scott
*Assistant Examiner*—Wesley S. Ratliff, Jr.
*Attorney, Agent, or Firm*—Robert K. Rhea

[57] ABSTRACT

A lever mechanism which is particularly suitable for use in a ventilator having medical applications, the lever mechanism being characterized in that a pivotable lever element is mounted to a support member by way of a fulcrum which is variable in position relative to the length of the lever element. The fulcrum incorporates a pinion which meshes with rack portions of the lever element and the support member in order that the lever element is prevented from freely translating relative to the pinion and the support member.

3 Claims, 7 Drawing Figures

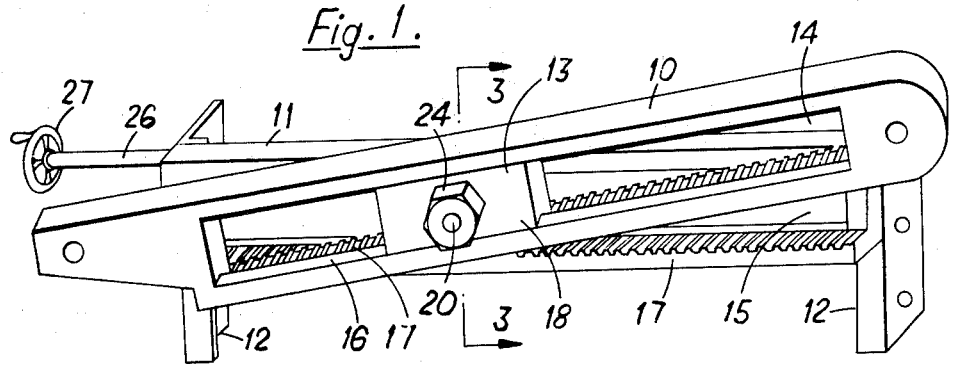
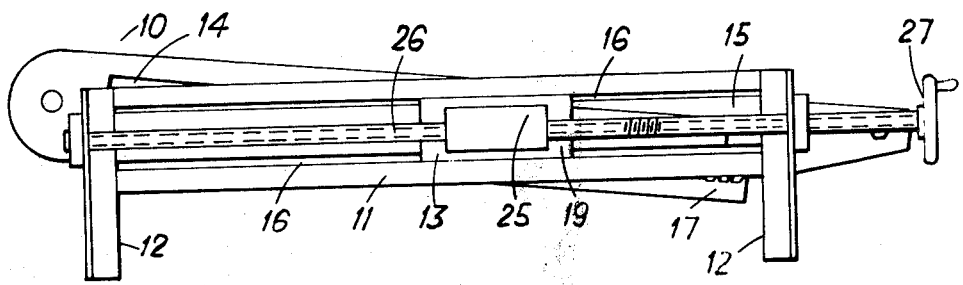
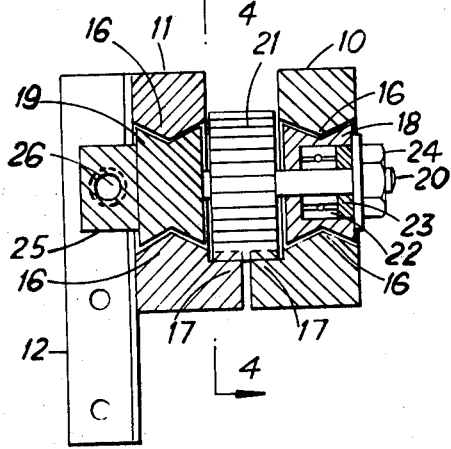
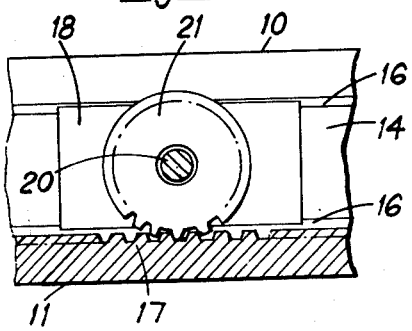

STROKE VARYING MECHANISM

This invention relates to a stroke varying mechanism and, more specifically, to a lever mechanism having a fulcrum which is positionably variable, during actuation of the mechanism, to vary the stroke of the mechanism.

The mechanism in accordance with the invention (as below defined) may be used in various application, such as in machine tools or fluid displacement devices, where a variable stroke lever movement is required.

Many lever mechanisms are currently known to exist which incorporate a fulcrum which is positionable in accordance with stroke requirements of a lever arm associated with the fulcrum, but such systems are lacking in that the position of the fulcrum cannot be adjusted conveniently during actuation of the mechanism. The present invention seeks to provide an arrangement wherein such an adjustment might be conveniently effected.

Thus, there is provided in accordance with the present invention, a lever mechanism comprising:
a. a lever element,
b. a fulcrum pivotably supporting the lever element and which is movable to permit selective positioning thereof intermediate the ends of the lever element, and
c. means associated with the fulcrum engaged in driving relationship with the lever element, said means being arranged to prevent free translation of the lever element with respect to the fulcrum but being operative to permit the selective positioning of the fulcrum between the ends of the lever element whilst the pivotable support between the fulcrum and the lever element is preserved.

The means associated with the fulcrum preferably comprises a pinion which is engaged in driving relationship with the lever element by way of a rack portion of the lever element. However, the driving relationship might be established by way of a mechanical equivalent of a rack-and-pinion interconnection, the fundamental requirement of the driving relationship being that an interconnection between the lever element and the fulcrum is preserved during pivotal movement of the lever element about the fulcrum.

The lever mechanism in accordance with the invention has particular, although non-exclusive, applications in relation to ventilators which are employed in the medical field for artificially respirating a patient with a gas such as air or oxygen, or an anaesthetic gas.

The volume of gas which is passed into and out of a patient's lungs per minute (i.e., the so-called minute volume) is an essential basic parameter for a ventilator machine/patient combination. This volume depends on many factors, including the stroke volume of a pump, condition of a patient's lungs, rate of ventilation and the pressure waveform of ventilation affecting rate of rise of pressure. In practice, the ventilator machines are set up on the basis of practical experience gained by an operator and by taking into account the factors concerned in a particular case.

In adults, the factors are in general less critical than with children and a wide range of mechanical cycling principles may be used satisfactorily. However, with very small children, infants and neonates (including premature born infants), the factors became much more critical and it has generally been found that the most satisfactory method of operating a ventilator is to observe peak inspiratory pressure readings in the circuit and to adjust the gas displacement volume (i.e., the stroke volume) of the machine to obtain what is considered to be a safe, adequate pressure to result in satisfactory ventilation of the patient's lungs.

Known ventilator machines customarily utilise a piston or bellows type pump for delivering air or other gas to a patient's lungs (generally by way of a heater/humidifier apparatus) and the stroke volume of the pump is varied by adjusting the stroke of a motor driven lever mechanism associated with the piston or bellows. It is not sufficient to simply shift the position of the lever mechanism relative to the pump (because this would result in a change in the time ratio of inspiration to expiration) and it is therefore necessary to modify the fulcrum position of the lever mechanism. This is, in effect, achieved in some existing machines which employ rotating links, the length of which are adjusted to modify the stroke, but such machines must be rendered inoperative whilst adjustment is being made. This is most inconvenient because the patient must be separately respired whilst an adjustment is being made. Other known machines have oscillating link mechanisms but these have to be adjusted while in motion, this demanding an onerous degree of dexterity on the part of the operator.

The lever mechanism in accordance with the present invention (as above defined) has particular application in relation to ventilator apparatus because it permits convenient variation of the fulcrum position when the mechanism is either in operation or idle, and without there being any need to manipulate the (moving) lever element of the mechanism. Also, because the stroke of the mechanism is varied by adjusting the position of the fulcrum, the mechanism provides for a constant inspiration/expiration ratio throughout the adjustable stroke range.

Figure 6:
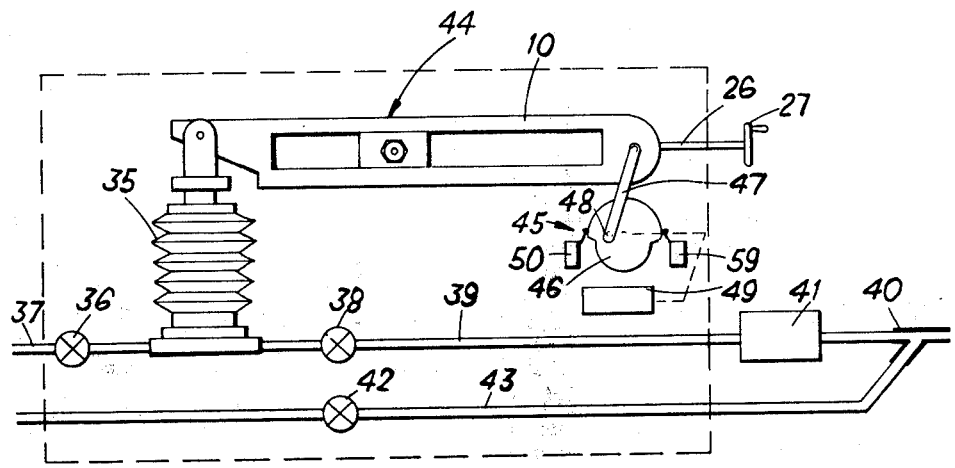

The invention will be more fully understood from the following description of a preferred embodiment thereof taken in conjunction with the accompanying representations wherein, FIG. 1 is a perspective view of a lever mechanism, FIG. 2 is an elevation view of the obverse side of the mechanism shown in FIG. 1, FIG. 3 is a sectional end elevation view of the mechanism taken through section plane 3—3 of FIG. 1, FIG. 4 is a sectional side elevation view of a portion of the mechanism taken through section plane 4—4 of FIG. 3, FIG. 5 is a plan view of the lever mechanism shown in operative association with a fulcrum position indicating pointer, FIG. 6 is a schematic representation of a ventilator apparatus incorporating the lever mechanism of FIGS. 1 to 5, and FIG. 7 is a schematic representation of control circuitry associated with the ventilator of FIG. 6.

As shown in the drawings, the lever mechanism comprises a pivotable lever element 10, a stationary member 11 which would normally be mounted to a support frame or chassis (not shown) by brackets 12, and a fulcrum assembly 13.

The lever element 10 and the stationary member 11 are formed with complementary slideways 14 and 15, which support the fulcrum assembly 13, and the slideways are each defined by opposed V-form slide rails 16.

Also, the lever element 10 and the stationary member 11 are each formed with an integral, laterally projecting rack portion 17.

The fulcrum assembly 13 comprises slide blocks 18 and 19 which respectively locate in the slideways 14 and 15, a pivot pin or axle 20 which extends between the slide blocks, and a pinion 21 which is mounted for free rotation upon the pivot pin. The pinion 21 meshes in positive driving relationship with the two rack portions 17 and is disposed concentrically about the axis of the mechanism.

The pivot pin 20 is formed integrally with the slide block 19, and it is journal mounted by way of a bearing 22 and a bearing plate 23 in the slide block 18. A nut 24 is fitted to the free end of the pivot pin 20 and serves to hold the entire structure in an assembled condition.

The fulcrum assembly 13 comprises a unitary structure and it is movable as such in the longitudinal direction of the slideways 14 and 15. Thus, the fulcrum assembly pivotably supports the lever element 10, and the fulcrum is movable to permit its selective positioning between the ends of the lever element, whereby the driving to driven stroke relationship of the lever element may be modified. Also, because the single pinion member 21 of the fulcrum assembly is engaged in driving relationship with the rack portions 17 of both the lever element 10 and the stationary member 11, free translation of the lever element with respect to the stationary member is prevented.

In operation of the mechanism (i.e., during pivotal motion of the lever element 10 relative to the stationary member 11), the rack portion 17 of the lever element rolls around the pinion 21 and, because the pinion 21 remains in mesh with the respective racks 17 at all times, the position of the fulcrum assembly may be modified during relative pivotal movement between the lever element and the stationary member.

It is acknowledged that, as the rack 17 rolls back and forth around the pinion 21, the lever element 10 will advance and recede along its own length. This effect will be manifested by a small degree of constrained translation between the lever element and the fulcrum assembly or the support member but, provided that the pinion is of a small diameter relative to the length of the lever element, any such translation will be of no significance in the majority of practical applications of the mechanism.

To permit selective positioning of the fulcrum assembly 13 between the ends of the lever element 10 and, consequently, between the ends of the support member 11, the fulcrum slide block 19 is formed with a screw-threaded projection 25 which engages with a bearing supported lead screw 26. As the lead screw is turned, by way of a handle 27, the fulcrum assembly is caused to travel in the axial direction of the screw.

As shown in FIG. 5, the lever mechanism may be mounted in operative relationship with an indicator mechanism which provides an indication of an instantaneous position of the fulcrum assembly relative to the length of the lever element 10. Thus, the lead screw 26 is fitted with a first bevel gear 28 which meshes with a second bevel gear being mounted to one end of a secondary lead screw 29 which carries a threaded saddle 30.

The saddle 30 is constrained against rotation by an indicating pointer 31 passing through a slot 32 within an associated casing 33, and the saddle together with the pointer is caused to track back-and-forth along the secondary lead screw 29 in accordance with changes in the position of the fulcrum 13.

As hereinbefore mentioned, the above described lever mechanism has special application in a ventilator, and such a ventilator is shown in a schematic form in FIG. 6 of the drawings.

Thus, the ventilator comprises a bellows type pump 35 which is connected through a first solenoid operated (intake) valve 36 to a gas supply line 37 and through a second solenoid operated (inspiratory) valve 38 to a delivery line 39. The supply line 37 would normally be connected to a source of air, oxygen or anaesthetic gas, and the delivery line 39 would normally be connected to an endo-tracheal fitting 40 for delivering gas as to a patient's lungs. Also, a gas heater and humidifier 41, such as of the type described in co-pending application No. 396,032 filed September 10, 1973 would normally be connected in the delivery line.

A third solenoid operated (expiratory) valve 42 is located in an expiratory line 43 which is associated with the endo-tracheal tube fitting 40 and which exhausts to atmosphere.

The bellows 35 is connected to and actuated by a variable stroke lever mechanism 44 (of the type above described) and the lever mechanism is driven in an oscillatory fashion by a motor driven crank mechanism 45. The crank mechanism comprises a shaft mounted crank plate 46, a driving arm 47 coupling the lever element 10 of the lever mechanism 44 to an eccentric 48 on the crank plate, and an electric commutator motor 49.

In operation of the ventilator apparatus described thus far, the motor 49 is energised to drive the lever mechanism 44 and, consequently, to effect expansion and compression of the bellows 35. During expansion of the bellows (i.e., during an expiratory stage) valves 36 and 42 are opened and valve 38 is closed. Then, during compression of the bellows (i.e., during an inspiratory stage), valve 38 is opened (to permit delivery of gas to a patient's lungs) and the valves 36 and 42 are closed.

Synchronous operation of the valves 36, 38 and 42 is controlled by an electrical switch 50 which is actuated during each cycle of the apparatus by a cam face of the crank plate 46.

Figure 7:
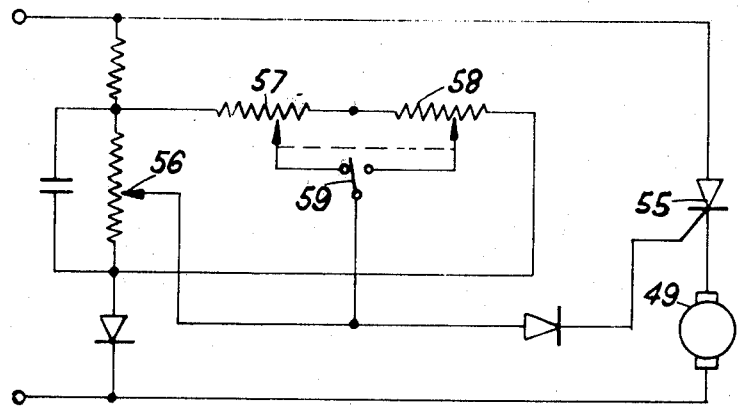

It will be appreciated from the foregoing description that the inspiration to expiration stroke ratio of the lever mechanism will remain constant, whatever might be the stroke volume (or fulcrum setting) of the mechanism. However, it is frequently desirable that the inspiration to expiration stroke ratio should be adjustable and, to avoid interferring with the stroke volume of the mechanism, this is achieved by varying (i.e., stepping) the speed of the motor 49 during each cycle of the mechanism. FIG. 7 of the drawings shows a circuit diagram which permits speed stepping of the motor during each cycle of the mechanism, independently of the number of revolutions performed by the motor per unit of time.

Thus, as shown in FIG. 7, the motor 49 is connected across a single phase A.C. line and through a S.C.R. 55, the instantaneous speed of the motor being controlled by gating of the S.C.R.

The overall speed or, in other words, the number of revolutions of the motor per unit of time, is controlled by way of a speed control potentiometer 56 which is located in the gate circuit of the S.C.R., and the inspiration/expiration speed stepping during each cycle of the lever mechanism 44, is controlled by ganged ratio control potentiometers 57 and 58.

The potentiometers 57 and 58 are located in series one with the other and in parallel across the speed control potentiometer 56, and they too are in the gate circuit of the S.C.R. 55. Also, the two potentiometers 57 and 58 are alternatively switched into S.C.R. gate circuit by a switch 59 during each revolution of the cam plate 46. The disposition of the switch 59 relative to the cam plate is shown in FIG. 6 of the drawings.

The two potentiometers 57 and 58 are ganged in such manner that as the resistance of one is increased, the resistance of the other is decreased by an approximately equal amount, this providing for control of speed stepping during each revolution of the crank mechanism 45.

I claim:

1. A lever mechanism comprising,
   a lever element having a rack portion,
   a fulcrum pivotably supporting the lever element and which is movable to permit selective positioning thereof intermediate the ends of the lever element,
   a stationary support member disposed adjacent and parallel to the lever element, said stationary member having a rack portion, and
   means associated with the fulcrum engaged in driving relationship with the lever element for preventing free translation of the lever element with respect to the fulcrum but being operative to permit the selective positioning of the fulcrum between the ends of the lever element whilst the pivotable support between the fulcrum and the lever element is preserved, said fulcrum associated means including,
   two slide blocks,
   one said slide block being slide mounted to the lever element and the other said slide block being slide mounted to the stationary support member,
   an axle extending between said slide blocks, and,
   a pinion carried by said axle and engaged in said driving relationship with the respective rack portion of said lever element and said stationary member.

2. A lever mechanism as claimed in claim 1 and further including,
   a lead screw engaging said fulcrum and wherein the fulcrum is movable as a unit along the length of both the lever element and the support member by rotation of the lead screw.

3. A lever mechanism as claimed in claim 1 wherein the axle is non-rotatable with respect to the slide block associated with the support member, and wherein both the pinion and the slide block associated with the lever element are journal mounted to the axle.

* * * * *